United States Patent Office 3,111,183
Patented Nov. 19, 1963

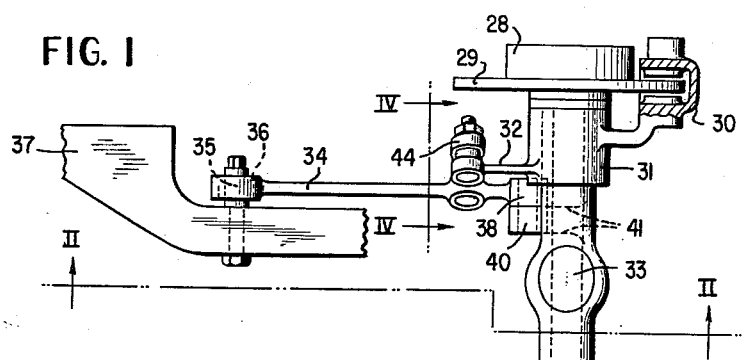
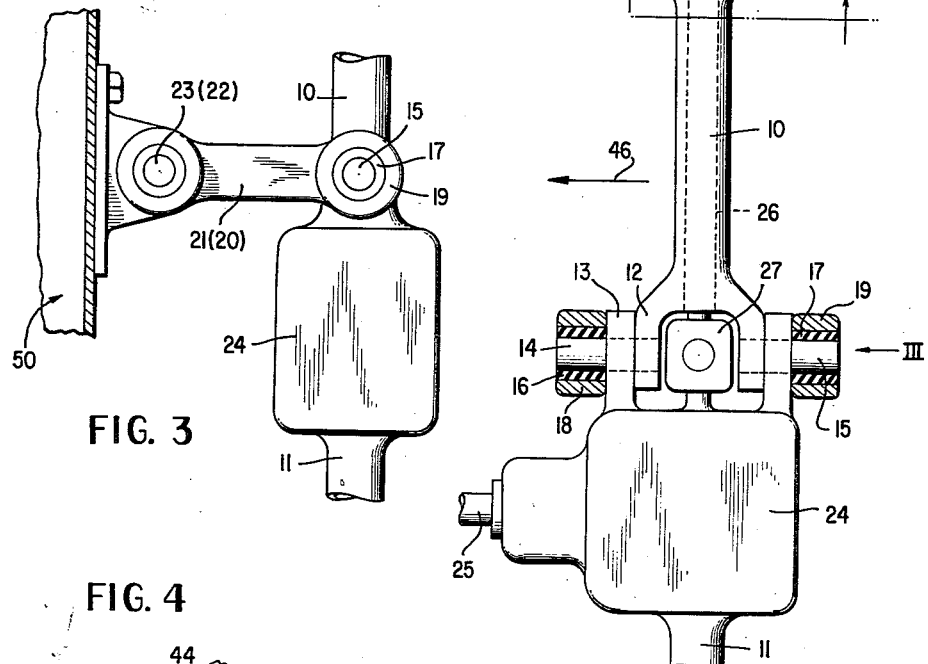
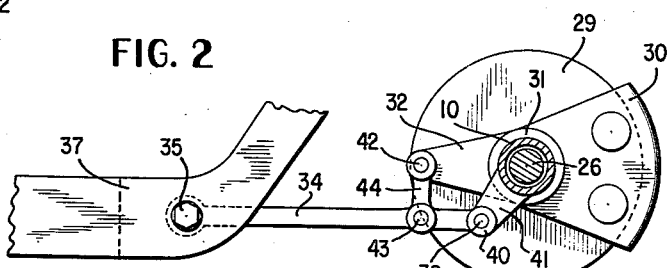
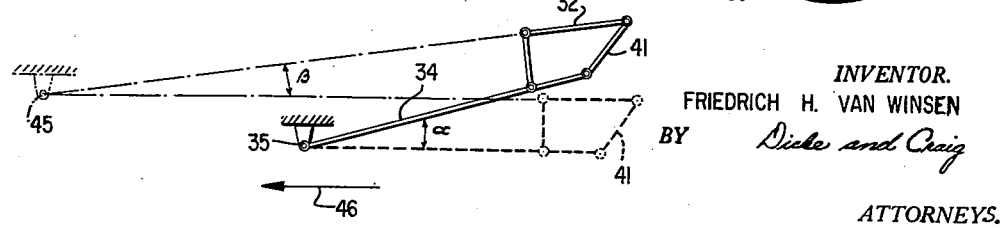
INVENTOR.
FRIEDRICH H. VAN WINSEN
BY Dicke and Craig
ATTORNEYS.

3,111,183
INSTALLATION FOR EQUALIZING BRAKE NOSE-DIVING MOVEMENTS IN MOTOR VEHICLES
Friedrich H. van Winsen, Kirchheim, Teck, Germany, assignor to Daimler-Benz Aktiengesellschaft, Stuttgart-Unterturkheim, Germany
Filed Dec. 11, 1961, Ser. No. 158,192
Claims priority, application Germany Dec. 13, 1960
9 Claims. (Cl. 180—73)

The present invention relates to an arrangement for the equalization of brake nodding or nose-dive movement of motor vehicles in which the brake stator is pivotably supported on the wheel axle.

With the known prior art installations of this type, the brake stator is directly supported at the motor vehicle body or frame against rotary movements. It has also been proposed already in the prior art to connect the brake stator rigidly with a longitudinal guide member provided for the guidance of the wheel axle.

In contradistinction thereto, it is proposed in accordance with the present invention to pivotably support the brake stator on a longitudinal guide member of the axle guide means which guide member itself is pivotably connected at the wheel axle at a point disposed outside of the wheel axle center. In particular, the brake stator may be supported in accordance with the present invention by means of a connecting link member pivotably secured at the brake stator and at the longitudinal guide member and extending approximately perpendicularly to the longitudinal guide member.

As compared to a direct support of the brake stator at the vehicle body or frame, the construction according to the present invention offers, above all, the advantages that an additional pivotal connection at the vehicle body or frame other than the pivotal connection already required for the longitudinal guide member is obviated and that with a small dimension of the stator in the longitudinal direction and with the resulting small weight of this structural part there may be achieved effectively a pivoting action of the brake stator about a remote ideal point of rotation at the relatively stationary vehicle part which, with a direct support of the brake stator at the vehicle body or frame, would require an actual substantial extension of the brake stator up to the point of rotation thereof. This latter advantage is also valid with respect to a brake stator arrangement which, as already proposed, is rigidly connected with the longitudinal guide member. As compared to such a construction, the construction in accordance with the present invention offers additionally the advantage that the guide member is disposed lower than the wheel center, whereby the pivotal connection thereof at the vehicle body or frame is less disturbing, for example, as regards the accommodation of the rear seats of a passenger motor vehicle, and, insofar as it concerns a driven axle construction, the suspension of the axle at the vehicle body or frame which is normally constructed as soft as possible, i.e., of soft rubber for reasons of desired good noise insulation, is loaded only by a certain portion of the reaction moment of the driving torque.

According to a further feature of the present invention, it is possible to move the ideal point of rotation of the brake stator at the relatively fixed part of the body which is determinative for the effectiveness of the braking nose-dive equalization into the desired position thereof, i.e., into the position thereof effecting more or less the equalization by so arranging the parts that the straight connecting line between the pivotal connecting point of the longitudinal guide member at the wheel axle and the center point of the wheel axle extends at an inclination to the direction of the connecting member.

Accordingly, it is an object of the present invention to provide an installation for equalizing the braking nose-dive movements of motor vehicles which effectively eliminates the inconveniences and shortcomings mentioned hereinabove that are normally encountered with the prior art constructions.

Another object of the present invention resides in the provision of an anti-nose-dive equalization arrangement for motor vehicles in which a relatively small number of pivotal connections is necessary and various parts thereof, particularly the brake stator assembly may be made of relative small dimensions and light weight.

Still another object of the present invention resides in the provision of an anti-nose-dive arrangement for motor vehicles in which the brake stator is effectively connected with the relatively fixed vehicle part about an ideal pivot point that is relatively remote from the corresponding wheel axis without requiring, however, a brake stator of equal dimensions.

A further object of the present invention resides in the provision of an anti-nose-dive installation for vehicles which permits the ready accommodation of other vehicle parts such as seats and which minimizes stresses in those parts designed to insulate the body against road and driving noises.

These an dother objects, features and advantages of the present invention will become more obvious from the following description when taken in connection with the accompanying drawing which shows, for purposes of illustration only, one embodiment in accordance with the present invention, and wherein FIGURE 1 is a partial top plan view of the right swinging half-axle of a nose-dive equalization installation in accordance with the present invention in which the corresponding wheel has been removed for clarity's sake;

FIGURE 2 is a cross sectional view taken along line II—II of FIGURE 1;

FIGURE 3 is a partial elevational rear view taken in the direction of arrow III in FIGURE 1;

FIGURE 4 is a partial cross sectional view taken along line IV—IV of FIGURE 1, and FIGURE 5 is a schematic showing, analogous to the showing of FIGURE 2, of the relationships of the movements of the various parts during deflections of the axle member.

Referring now to the drawing wherein like reference numerals are used throughout the various views to designate corresponding parts, and more particularly to FIGURES 1 and 2, the rear axle shown therein essentially consists of the right swinging half-axle tubular member 10 and the left swinging half-axle tubular member 11. The two swinging half-axles 10 and 11 terminate at the inner ends thereof in fork-shaped parts 12 and 13 respectively, which are pivotally connected with each other by means of pivot pins 14 and 15. The pins 14 and 15 are supported within bearing eyes or lugs 18 and 19, which, in turn, are supported on support arms 20 and 21 (FIGURE 3). The support arms 20 and 21 are secured in pivot bearings 22 and 23 provided also with appropriate rubber bushings at a cross frame bearer member generally designated by reference numerals 50 of the motor vehicle body or frame. The axle drive housing 24 containing the differential gear is rigidly connected with the left swinging half axle tubular member 11 and pivots therewith. The vertical central longitudinal plane of the vehicle extends through pivots 14 and 15.

The drive takes place from the cardan shaft 25. A universal joint 27 is necessary for the right wheel drive shaft 26, the center point of which is disposed in the center axis of the pins 14 and 15. The drive shaft 26 is journalled within the swinging half axle tubular member 10 and carries at the outer end thereof the wheel (not shown), the wheel rim or felly of which is to be thought of as secured to the rotating part 28 rotating together with the wheel. A brake disk 29 also rotates in unison with the rotating part 28 and therewith with the wheel. The brake disk 29 is surrounded by a clamp-like brake-jaw 30 forming part of a disk brake which is supported with the hub portion 31 thereof on the axle tubular member 10 in a freely pivotal manner. A support arm 32 extends forwardly in the driving direction, indicated by arrow 46, from the hub 31 of the disk brake.

The half axle 10 is spring-supported against the vehicle body or frame by means of a spring (not shown) of any suitable construction, such as a coil spring which acts against the half axle 10 at 33.

A longitudinal guide member 34 is pivotably supported at 35 on a frame longitudinal bearer member 37 with the aid of a rubber bushing 36. At the opposite end thereof, the longitudinal guide member 34 is supported with the aid of a bearing lug or eye 38 and of a pin 39 within a bearing lug or eye 40 which is arranged at a securing arm 41 extending downwardly from the swinging half axle tube 10 at an inclination. The support arm 32 of the disk brake is operatively connected with the longitudinal guide member 34 by means of two ball joints 42 and 43 and a link member 44 establishing the connection between the two ball joints 42 and 43.

As may be readily seen from FIGURE 5, with a deflection or spring movement of the swinging half axle 10 in the upward direction, i.e., from the position thereof shown in FIGURE 5 in dash line into the position thereof shown in full line, the guide member 34 pivots about an angle $\alpha$ which is larger than the angle $\beta$ determining the braking nose-dive equalization about which pivots the support arm 32. The point 45 about which the support arm 32 effectively rotates is the imaginary point in which the support arm 32 would have to be pivotably connected directly at the frame or body in order to fulfill the same movements as are obtained with a construction in accordance with the present invention.

It might also be mentioned that the arm 41 has to maintain its direction in space since the suspension of the tubular axle member 10 at the vehicle body or frame by the support arms 20 and 21 does not permit a tilting of the axle tube 10. The axle center has moved slightly toward the left with the deflection $\alpha$ shown in FIGURE 5. This movement, however, is made possible by a slight parallel swinging of the support arms 20 and 21 supported within the respective rubber bearings thereof.

While I have shown and described one embodiment in accordance with the present invention, it is understood that the same is not limited thereto, but is susceptible of many changes and modifications within the spirit and scope thereof. For example, instead of the cross bearer member 50 and/or of the longitudinal bearer member 37, equivalent structural parts may be used which may be formed in any conventional manner, for example, as self-supporting type body parts. Additionally, the swinging half axles 10 and 11 may be spring supported against the vehicle frame or body by any suitable known spring system. Furthermore, the disk brake 30 may also be of any known construction and the various elastic pivot bearings may be made in accordance with well known techniques.

Thus, it is obvious that the present invention is not limited to the particular details shown and described herein which may be changed in numerous ways as known by a person skilled in the art, and I therefore do not wish to be limited to these details, but intend to cover all such changes and modifications as are encompassed by the scope of the appended claims.

I claim:

1. An installation for equalizing the brake nose-diving movements of motor vehicles having a relatively stationary part, wheel axle means adapted to move relative to said stationary part and brake means including brake stator means pivotably supported on said axle means, comprising longitudinal guide means operatively secured adjacent one end to said part, first means pivotally connecting said guide means to said wheel axle means for pivoting about an axis disposed outside of the wheel axle means longitudinal axis, and means for transmitting the braking force of said brake means to said guide means and said relatively stationary part including second means pivotally supporting said brake stator means on said guide means comprising link means and pivotal connecting means pivotally connecting said link means at said brake stator means and at said guide means.

2. An installation for equalizing the brake nose-diving movements of motor vehicles having a relatively stationary part, wheel axle means adapted to move relative to said stationary part and brake means including brake stator means pivotably supported on said axle means comprising longitudinal guide means secured adjacent one end to said part, first means pivotally connecting said guide means to said wheel axle means for pivoting about an axis disposed outside of the wheel axle means longitudinal axis, and means for transmitting the braking force to said guide means and said relatively stationary part including second means pivotally supporting said brake stator means on said guide means comprising link means extending approximately perpendicularly to said guide means and pivotal connecting means pivotally connecting said link means at said brake stator means and at said guide means.

3. An installation for equalizing the brake nose-diving movements of motor vehicles having a relatively stationary part, wheel axle means adapted to move relative to said stationary part and brake means including brake stator means pivotably supported on said axle means, comprising longitudinal guide means secured adjacent one end to said part, first means pivotally connecting said guide means to said wheel axle means for pivoting about an axis disposed outside of the wheel axle means longitudinal axis, and means for transmitting the braking force to said guide means and said relatively stationary part including second means pivotally supporting said brake stator means on said guide means comprising link means extending approximately perpendicularly to said guide means and pivotal connecting means pivotally connecting said link means at said brake stator means and at said guide means, the straight line between the pivot point of said guide means at said axle means and the center point of said axle means extending, as viewed in side view, at an inclination to said link means.

4. An installation for equalizing the brake nose-diving movements of motor vehicles having a relatively stationary part, wheel axle means and brake stator means pivotably supported on the wheel axle means, comprising longitudinal guide means, pivotal connecting means pivotally connecting said guide means near one end thereof at said relatively stationary part, further pivotal connecting means pivotally connecting said guide means near the other end thereof at said wheel axle means about a point outside the wheel axle center, and means pivotally supporting said brake stator means on said guide means including connecting means pivotally connected at said stator means and at said guide means.

5. In a motor vehicle having a relatively stationary part, axle means, guide means for said axle means operatively secured adjacent the opposite ends thereof, respectively, to said part and said axle means, and brake stator means pivotably supported on said axle means, the improvement essentially consisting of a braking nose-dive equalization system comprising means for transmitting the braking force to said guide means and therethrough to said relatively stationary part including linkage means pivotally interconnecting said stator means and said guide means.

6. An installation for equalizing the brake nose-diving movements of motor vehicles having a relatively stationary part, axle means and brake stator means pivotably supported on the axle means, comprising longitudinal guide means, first pivotal connecting means pivotally connecting said guide means near one end thereof at said relatively stationary part, second pivotal connecting means pivotally connecting said guide means near the other end thereof at said wheel axle means at a point outside the wheel axle center, and support means pivotally supporting said brake stator means on said guide means including a connecting member extending approximately perpendicularly to said guide means and further pivotal connecting means pivotally connecting said connecting member at said brake stator means and at said guide means.

7. In a motor vehicle having a relatively stationary part, axle means, guide means for said axle means operatively secured adjacent the opposite ends thereof, respectively, to said relatively stationary part and said axle means, and brake stator means pivotably supported on said axle means, the improvement essentially consisting of a braking nose-dive equalization system comprising means for transmitting the braking force to said guide means and therethrough to said relatively stationary part including means pivotally connecting said brake stator means with said guide means, the operative connection between said guide means and said axle means comprising means pivotally securing said guide means to said axle means for pivoting about an axis spaced from the central longitudinal axis of said axle means.

8. An installation for equalizing the brake nose-diving movements of motor vehicles having a relatively stationary part, swinging half-axle means, elastic support means for said half axle means and brake stator means pivotably supported on a respective half-axle means, comprising longitudinal guide means, elastic pivotal connecting means pivotally connecting said guide means near one end thereof at said relatively stationary part, pivotal connecting means pivotally connecting said guide means near the other end thereof at said wheel axle means, and means for transmitting the braking force to said guide means and therethrough to said relatively stationary part comprising support means pivotally supporting said brake stator means on said guide means including a connecting member and ball joint means pivotally connecting said connecting member at said stator means and at said guide means.

9. An installation for equalizing the brake nose-diving movements of motor vehicles having a relatively stationary part, swinging half-axle means, elastic support means for said half axle means and brake stator means pivotably supported on a respective half-axle means, comprising longitudinal guide means, elastic pivotal connecting means pivotally connecting said guide means near one end thereof at said relatively stationary part, pivotal connecting means pivotally connecting said guide means near the other end thereof at said wheel axle means with the pivot axis thereof in non-coaxial relationship with the center axis of a respective half axle means, and support means pivotally supporting said brake stator means on said guide means including a connecting member extending approximately perpendicularly to said guide means and ball joint means pivotally connecting said connecting member at said stator means and at said guide means.

References Cited in the file of this patent

UNITED STATES PATENTS

| | | |
|---|---|---|
| 2,083,085 | Palmer | June 8, 1937 |
| 2,129,232 | Paton | Sept. 6, 1938 |
| 2,998,265 | Kozicki | Aug. 29, 1961 |
| 3,006,429 | Polhemus et al. | Aug. 31, 1961 |